United States Patent [19]
Ono

[11] Patent Number: 4,993,745
[45] Date of Patent: Feb. 19, 1991

[54] SILENT, RATTLE-FREE PASSIVE SEAT BELT SYSTEM

[75] Inventor: Katsuyasu Ono, Yokohama, Japan

[73] Assignee: Nippon Seiko Kabushiki Kaisha, Japan

[21] Appl. No.: 406,249

[22] Filed: Sep. 12, 1989

Related U.S. Application Data

[62] Division of Ser. No. 278,012, Nov. 30, 1988, Pat. No. 4,889,363.

[30] Foreign Application Priority Data

Dec. 2, 1987 [JP] Japan .................. 62-184072[U]
Dec. 28, 1987 [JP] Japan .................. 62-332927

[51] Int. Cl.⁵ .................................... B60R 22/06
[52] U.S. Cl. ............................ 280/804; 280/808
[58] Field of Search ........... 280/804, 808; 297/469; 16/93 R, 93 D; 180/268

[56] References Cited

U.S. PATENT DOCUMENTS 4,695,076 9/1987 Hane .................... 280/804
4,809,809 3/1989 Hane .................... 280/804 X
4,840,402 6/1989 Yamamoto et al. ........ 280/804

FOREIGN PATENT DOCUMENTS 175542 7/1989 Japan .................. 280/804

Primary Examiner—Richard A. Bertsch
Assistant Examiner—Michael Mar
Attorney, Agent, or Firm—Wegner, Cantor, Mueller & Player

[57] ABSTRACT

A passive seat belt system is constructed of a guide rail, a slider movable along the guide rail, a webbing, a drive member for driving the slider, a bushing for connecting the drive member and slider in a state maintained in contact to each other with a gap left between the drive member and guide rail at the position of the bushing and on a side opposite to the slider, and contact members provided on the drive member with the bushing interposed therebetween. The contact members are in contact with the guide rail on a side opposite to the slider. Instead of the bushing and contact members, a cam may be provided between the drive member and slider for causing the slider to move in a direction away from the drive member when the drive member moves in a longitudinal direction.

4 Claims, 9 Drawing Sheets

FIG. 9
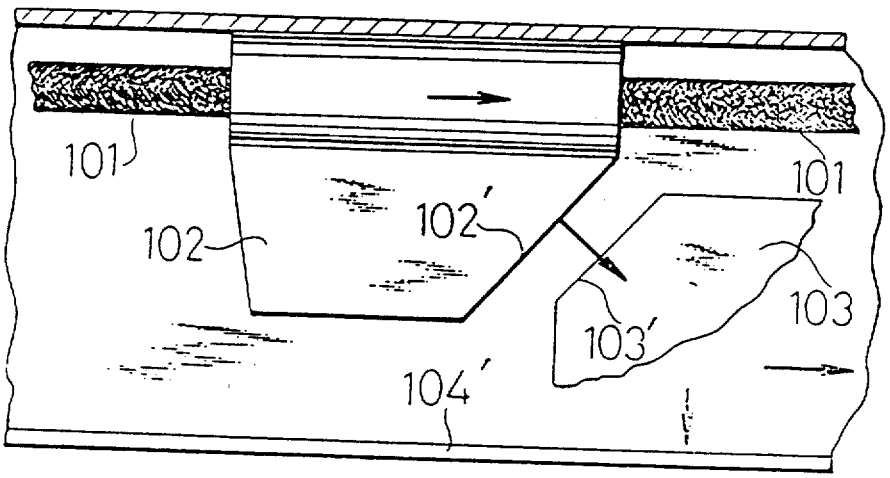
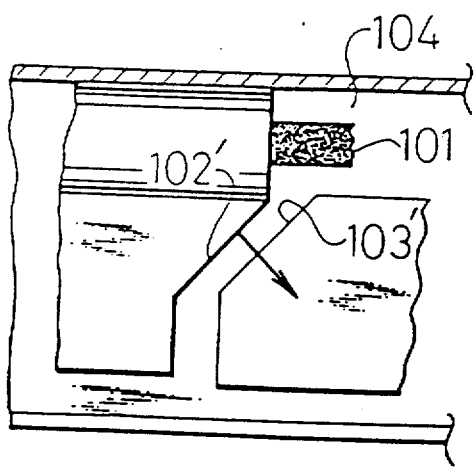
FIG. 10A
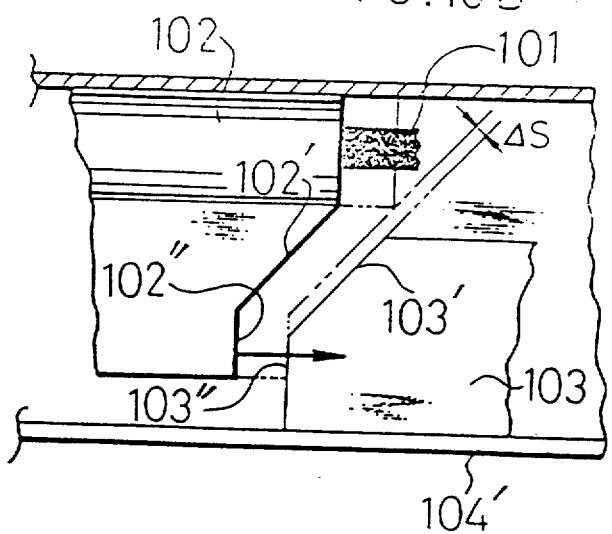
FIG. 10B

SILENT, RATTLE-FREE PASSIVE SEAT BELT SYSTEM

This application is a divisional of Ser. No. 278,012, filed Nov. 30, 1988, now U.S. Pat. No. 4,889,363.

BACKGROUND OF THE INVENTION

(1) Field of the Invention

This invention relates to a passive seat belt system adapted to be worn without bothering an occupant of an automotive vehicle for protecting the occupant from collision, and specifically to a drive mechanism for a silent, rattle-free passive seat belt.

(2) Description of the Related Art

Among the various drive mechanisms for passive seat belt systems is the type where a webbing is fastened to a slider guided by a guide rail, the slider being driven by a motor so that the webbing can move between the occupant restraint and occupant release positions. In drive mechanisms of this type, clearance exists between the slider and each face of the associated guide rail. This clearance is essential to allow the slider to glide freely.

However, because of practical machining and production tolerance limitations and the like, this clearance is not precisely uniform, not only in a single rail but also among production lots.

Too great a clearance makes it possible for the slider to rattle inside the guide rail, as sliding resistance and shoulder webbing tension vary. Consequently, the slider is repeatedly caught up and stopped —snagged— inside the guide rail, allowing so-called "chattering vibrations" and unpleasant noise and vibrations which may irritate the occupant.

The causes of such chattering vibrations are complex. The degree of the clearance between the slider and guide rail, the degree of the sliding resistance between the slider and guide rail, variations in the magnitude of the force by which the slider is pushed by the drive member, etc., are all believed to have a bearing. Chattering vibrations are also believed to occur when these causes meet certain conditions.

Based on a simplified model, the mechanism of occurrence of chattering vibrations may be described as follows.

In a seat belt mechanism of conventional type, where the slider is dragged along a glide channel by an associated drive member, undue clearance may allow the slider to make contact with the guide rail on only two points. In this case, the drive force twists the slider sufficiently for it to catch instead of advancing smoothly. As the force increases further, the slider is pulled free of its temporary impediment and advances a little. However, it then catches and stops again. It is believed that repetition of the above results in the vibrations.

If resistance is sufficiently small, the slider will move smoothly without the above problem. However, it is impossible to reduce sliding resistance because the coefficient of dynamic friction has at least a certain level of 0.2 or so and cannot be reduced to where such chattering vibrations can assuredly be eliminated. If the clearance is extremely wide, the slider may twist even to a diagonal position, causing it to snag in the guide rail. This is unlikely however in view of the probability of reasonable machining accuracy. In practice therefore the avoidance of chattering vibrations in such a design is not feasible because the drive force and webbing tension vary inter alia under conditions which also include sliding resistance of at least a certain level and clearances in a certain range.

Under these conditions, greater clearances encourage chattering vibrations whereas reduced clearances can inhibit or reduce them, even under quite adverse conditions. This indicates the importance of minimizing clearance, yet not so much that the slider may jam in the rail. The solution is to provide an automatic adjustment mechanism which always controls the degree of clearance to a suitable level.

SUMMARY OF THE INVENTION

With the foregoing in view, it is an object of this invention to automatically adjust the degree of clearance to maintain a level which eliminates chattering vibrations of the slider, thus overcoming unpleasant vibrations and noise.

In one aspect of this invention, there is thus provided a passive seat belt system which comprises:
a guide rail;
a slider movable along the guide rail;
a webbing fastened to the slider, which can provide selectively both an occupant restraining state and an occupant non-restraining state;
a drive member for driving the slider, said drive member being made of a material flexible in directions perpendicular to the length thereof;
a means for connecting the drive member and slider in a state maintained in contact to each other with a gap left between the drive member and guide rail at the position of said connecting means and on a side opposite to the slider; and
contact members provided on the drive member at predetermined longitudinal intervals with the connecting means interposed therebetween, said contact members being in contact with the guide rail on a side opposite to the slider.

In another aspect of this invention, there is also provided a passive seat belt system which comprises:
a guide rail;
a slider movable along the guide rail;
a webbing fastened to the slider, which can provide selectively both an occupant restraining state and an occupant non-restraining state;
a drive member for driving the slider; and
a means for connecting the drive member and slider to each other so as to allow the slider to move toward the drive member.

In a further aspect of this invention, there is also provided a passive seat belt system which comprises:
a guide rail;
a slider movable along the guide rail;
a webbing fastened to the slider, which can provide selectively both an occupant restraining state and an occupant non-restraining state;
a drive member for driving the slider; and
a cam means provided between the drive member and slider for causing the slider to move in a direction away from the drive member when the drive member moves in a longitudinal direction.

In the first and second aspects of this invention the drive member and slider are always in contact to each other. Since the drive member and slider can approach each other, the clearance between the slider and its associated guide portions of the guide rail is either eliminated or reduced over the entire length of the guide rail.

As a result, the slider can move smoothly while chattering noise and rattling are reduced.

In the third aspect of this invention the slider is always pushed toward a longitudinal slot in the rail under pressure from the drive member, so that any variations in the clearance between the slider and guide portions of the guide rail can be absorbed resiliently. Only a little play is therefore given between the slider and rail guides even if the clearance is wide. Even when clearance between the slider and its associated guide portions is eliminated the slider is still free from jamming and is able to move smoothly.

Since clearance between the slider and guide rail is never more than a certain level, the slider can be driven smoothly so that unpleasant vibrations and noise are prevented.

BRIEF DESCRIPTION OF THE DRAWINGS

The above and other objects, features and advantages of the present invention will become apparent from the following description and the appended claims, taken in conjunction with the accompanying drawings, in which:

FIGS. 9 and 10 show the direction of a force transmitted from the slide connector to the slider respectively.

DETAILED DESCRIPTION OF THE INVENTION

Figure 1:
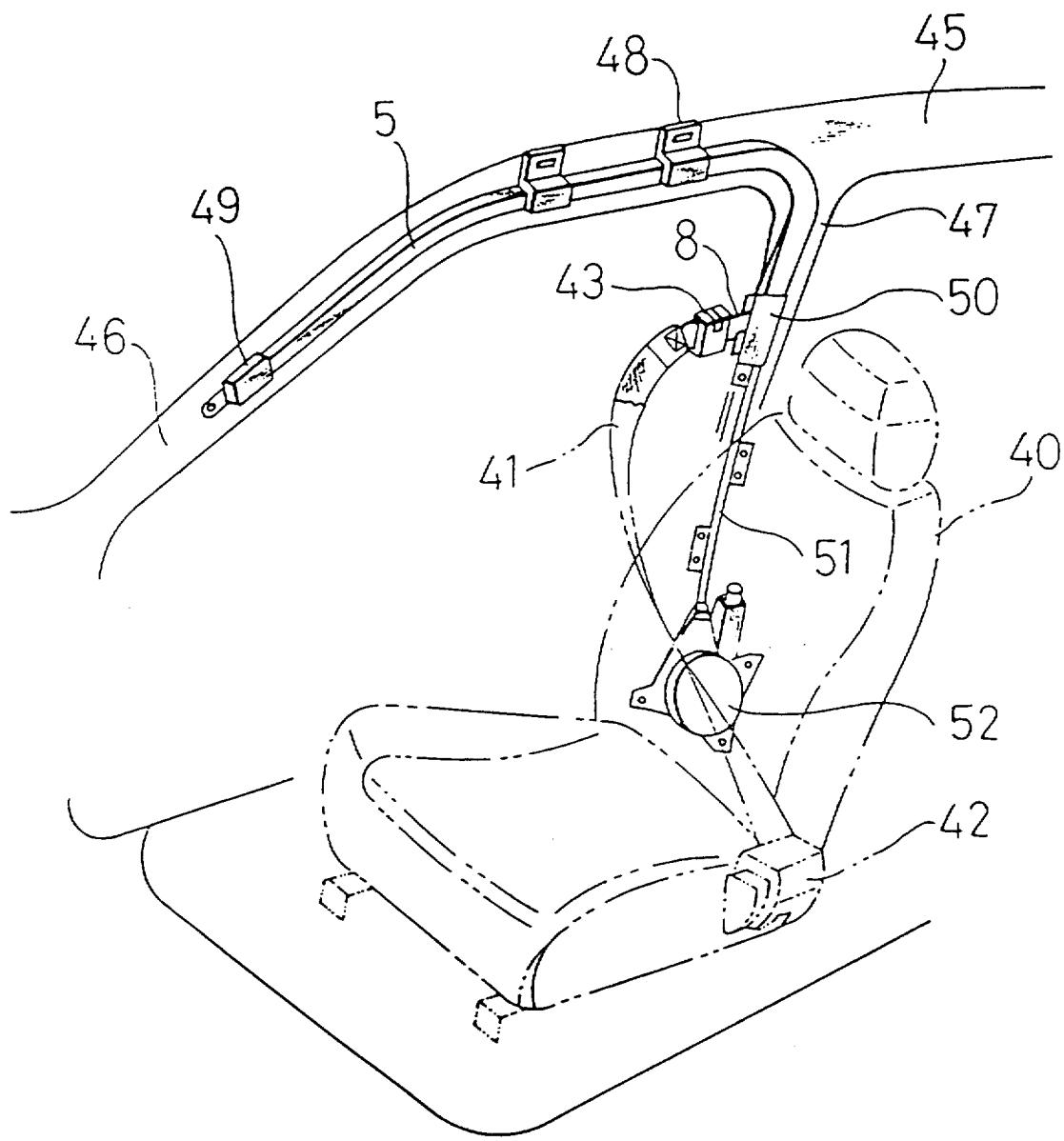
FIG. 1 is a perspective schematic of the overall construction of a passive seat belt system according to this invention.

FIG. 1 schematically illustrates the overall construction of a passive seat belt system to which the present invention can be applied successfully.

A base portion of a webbing 41 has been wound within an inner retractor 42 provided on a lower side wall of a seat 40, while a free end portion of the webbing is attached to a slider 8 by way of an emergency release buckle (ERB) 43. The ERB and slider may be provided as a unitary or integral unit.

On the other hand, a rail 5 is mounted on a roofside which is an inner wall of a roof of a vehicle. A slider 8 fits loosely in the rail 5 so that the slider 8 may move back and forth along the length of the vehicle. The rail 5 extends to a front pillar 46 at a front end portion thereof and also along a center pillar 47 at a rear end portion thereof. The rail 5 is fixed on the roofside at suitable locations by means of rail brackets 48. A front end switch 49 at the front end of the rail 5 detects when the slider 8 has reached the front end of the rail 5. An anchor latch 50 is provided at the rear end of the rail 5 to hold the slider 8 in place when the seat belt system is used by an occupant.

Inside the rail 5, the slider 8 fitted loosely therein is in engagement with a drive member constructed of a wire 1. The wire 1 extends from the anchor latch 50 and then through an outer tube 51, and is wound on a reel (not illustrated) provided inside a drive unit 52.

Figure 2:
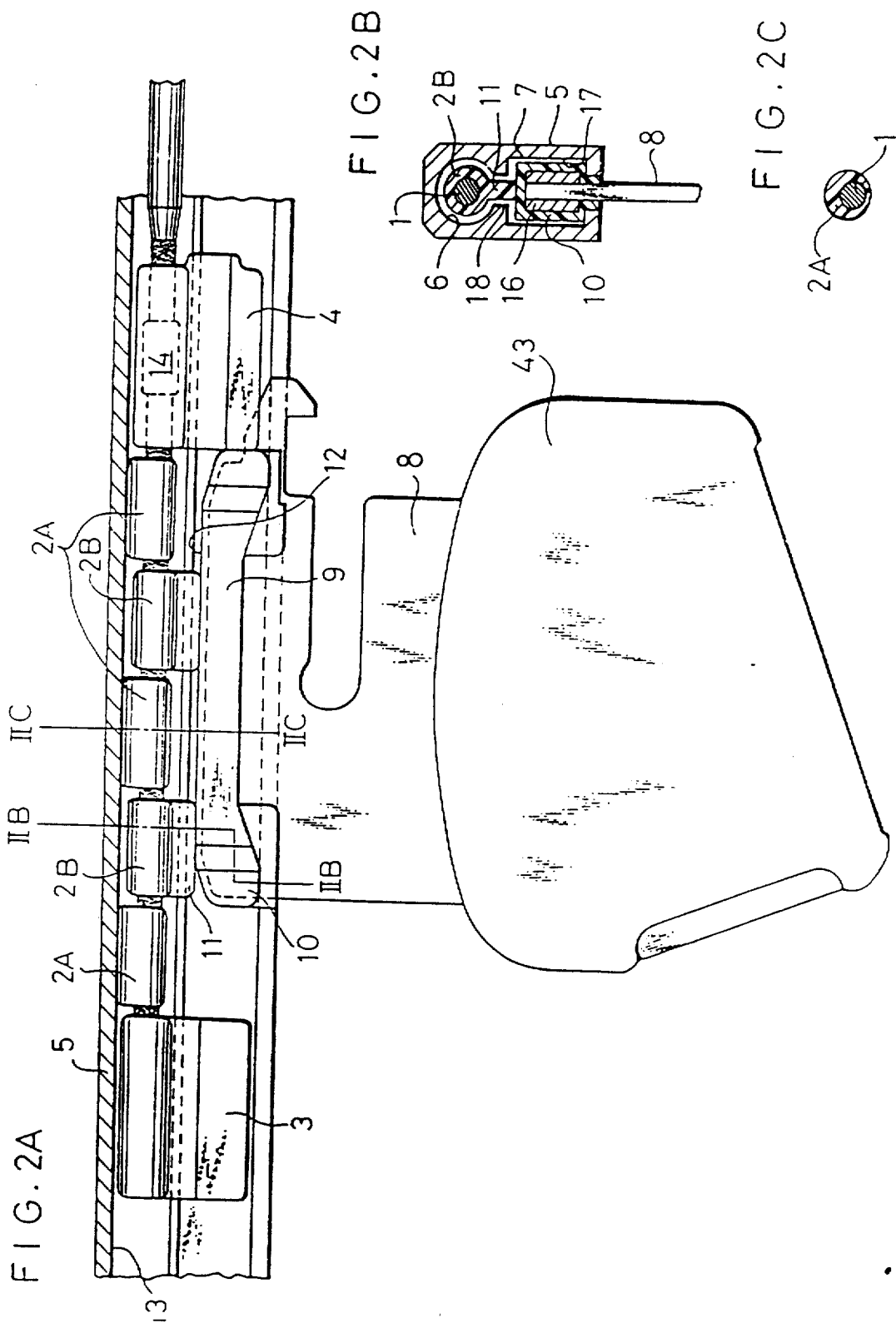
FIG. 2(A) is a partly cut-off fragmentary side view of a passive seat belt system according to a first embodiment of this invention.
FIG. 2(B) is a cross-section taken along line IIB—IIB of FIG. 2(A)
FIG. 2(C) is a cross-section view taken along line IIC—IIC of FIG. 2(A)

FIG. 2A depicts a structural relation between the rail 5, slider 8 and drive member.

Received inside the rail 5 are the wire 1 as the drive member, and drive blocks 3,4 and bushings 2A,2B all provided on the wire 1. A resin molding 10 of a slider head portion 9 is positioned between the drive blocks 3 and 4.

The drive member is now described in detail. The wire 1 is covered with a synthetic resin to reduce the frictional resistance between the wire 1 and rail 5, that between the wire 1 and outer tube 51, etc. No covering is however applied on the wire 1 at the locations where the bushings 2A,2B and drive blocks 3,4 are formed.

The bushings 2A,2B and drive blocks 3,4 are made of a synthetic resin of low frictional resistance and are formed as unitary members with the wire 1.

Plural bushings 2A,2B are formed at suitable intervals between the drive blocks 3 and 4.

As is shown in FIGS. 2(A) through 2(C), the plural bushings 2A,2B are arranged in such a way that the first bushings 2A biased from the central axis of the wire 1 toward a side opposite to the resin molding 10 on the slider head portion 9 and the second bushings 2B having a rib 11 extending toward the slider head portion 9 are alternated. The bushings, rail and slider are constructed in such a way that the sum of the distance from a contacting portion of each bushing 2A to the rail 5 (an upper surface of each bushing 2A as seen in the drawings) to a contacting portion of each bushing 2B to the slider and the height of the resin molding 10 of the slider head portion 9 becomes substantially equal to the distance between the upper wall of a wire channel 6 and the lower wall of a slider guide channel 7. Owing to this construction, the spacing between the slider 8 and wire 1 and that between the slider 8 and the rail 5 are normally zero. Even if the rail 5 contains some deformation due to dimensional errors, the wire 1 is flexed to allow the slider 8 to move toward the wire 1 so that the slider is allowed to run smoothly.

In the above-described first embodiment, the bushings 2A,2B and drive blocks 3,4 are provided as unitary members on the wire 1. It is feasible to mold them together directly on the wire 1. As an alternative, in order to avoid dropping of the bushings 2A,2B and drive blocks 3,4 from the wire 1 or formation of cracks therein, they may be molded together after forming base collars 14 of a desired material on the wire 1.

Next, slider 8 is described in detail. As is depicted in FIGS. 2(A) through 2(C), the slider 8 is formed flat as a whole. An ERB 43 is attached to a leg portion thereof and a thicker portion 16 is provided at the head portion 9. The resin molding 10 made of a synthetic resin is formed on all the surfaces of the thicker portion 16. The slider head portion 9 is received within the slider guide channel 7 of the rail 5 and is driven inside the rail 5 by the drive member. The slider guide channel 7 will be described in more detail subsequently. In order to facilitate smooth passage of the slider 8 by a bent portion of the rail 5, the slider head portion 9 may be partly cut away on a side facing the inner periphery of the bent portion of the rail 5.

In the first embodiment, the thicker portion 16 of the slider head 9 has been formed by die-casting. Alternatively, it could be formed by casting or forging during fabrication of the slider 8 or by securing a press-formed part.

The rail 5 internally defines, as shown in FIG. 2(B), the wire channel 6 and slider guide channel 7 which are circular and rectangular respectively in transverse cross-section. Both the channels 6,7 are communicated to each other over the entire length of the rail 5 by way of a narrow strait portion 18 so that the drive blocks 3,4 and the rib 11 of each bushing 2B can extend therethrough.

The operation of the first embodiment is now described. Let's assume that an occupant enters the vehicle. Upon closure of an associated door after the occupant has sat in the seat 40, the drive unit 52 is actuated to take up the wire 1. Accordingly, the slider 8 moves inside the rail 5 from its front end to the anchor latch 50 at the rear end of the rail 5. As a result, the occupant's body is restrained by the webbing 41 fastened to the slider 8 via the ERB 43, thereby establishing an occupant restraining state.

Let's next assume that the occupant wishes to leave the vehicle. Opening of the associated door causes the slider 8 to move in a direction opposite to that when the occupant entered the vehicle. When the slider 8 has actuated the front end switch 49 provided at the front end of the rail 5, the forward movement of the slider 8 is stopped. Accordingly, the webbing 41 is released from the occupant's body so that an occupant non-restraining state is established to allow the occupant easy egress from the vehicle.

As has been described above, even if the internal dimensions of the wire channel 6 and slider guide channel 7 within the rail 5 change depending on the position of the slider 8 due to fabrication tolerance and deformations as the slider 8 moves inside the rail 5, such dimensional changes can be absorbed successfully through flexion of the wire 1 carrying bushings 2A,2B. As a result, the slider 8 is allowed to move smoothly without development of chattering noise and/or rattling. Since no clearance exists between the slider head portion 9 and the drive member owing to the flexion of bushings 2A,2B and wire 1, no rattling noise is generated even when vibrations of the body of the vehicle are transmitted to the slider 8.

Figure 3:
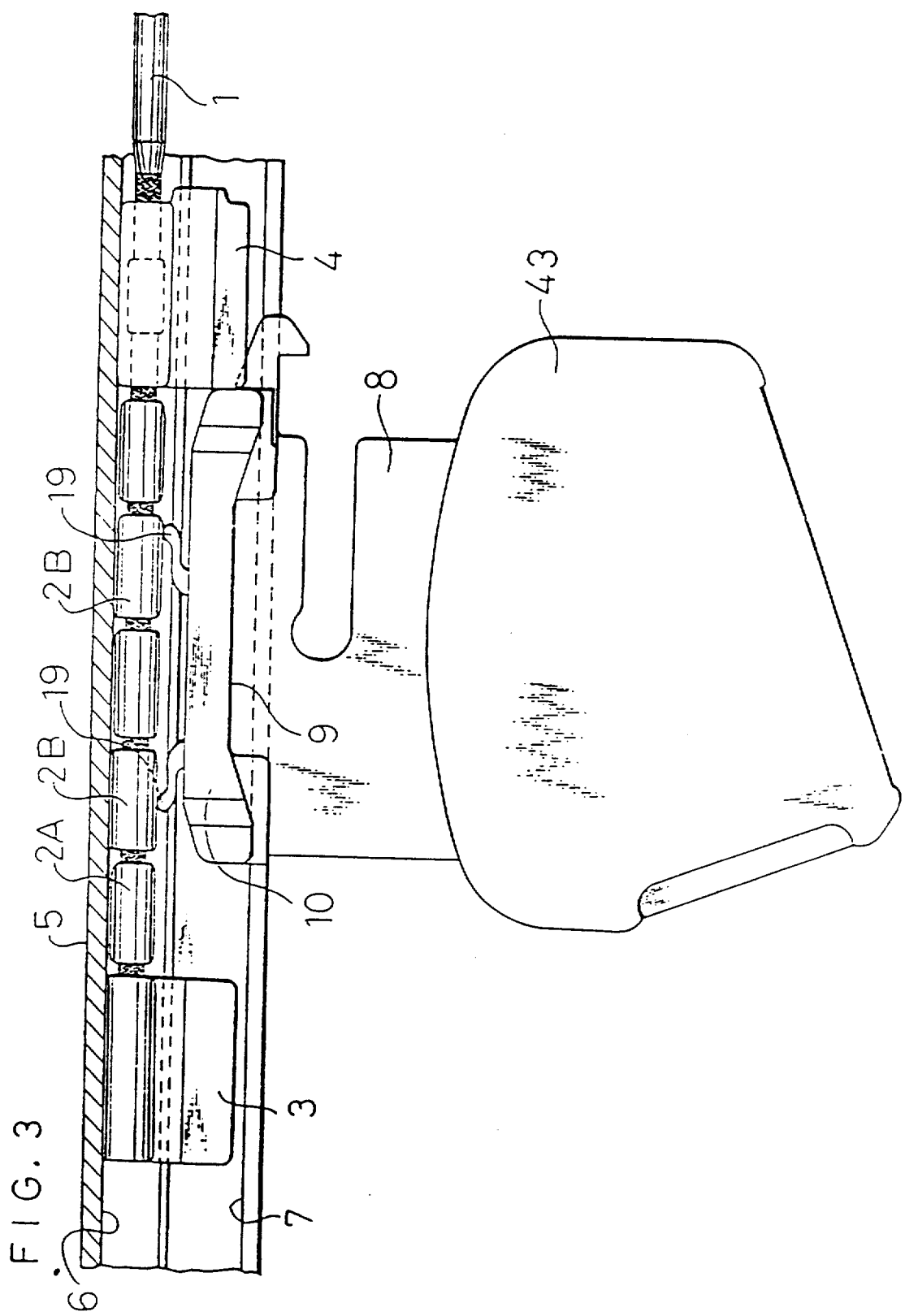
FIG. 3 is a partly cut-off fragmentary side view of a passive seat belt system according to a second embodiment of this invention.
Figure 4:
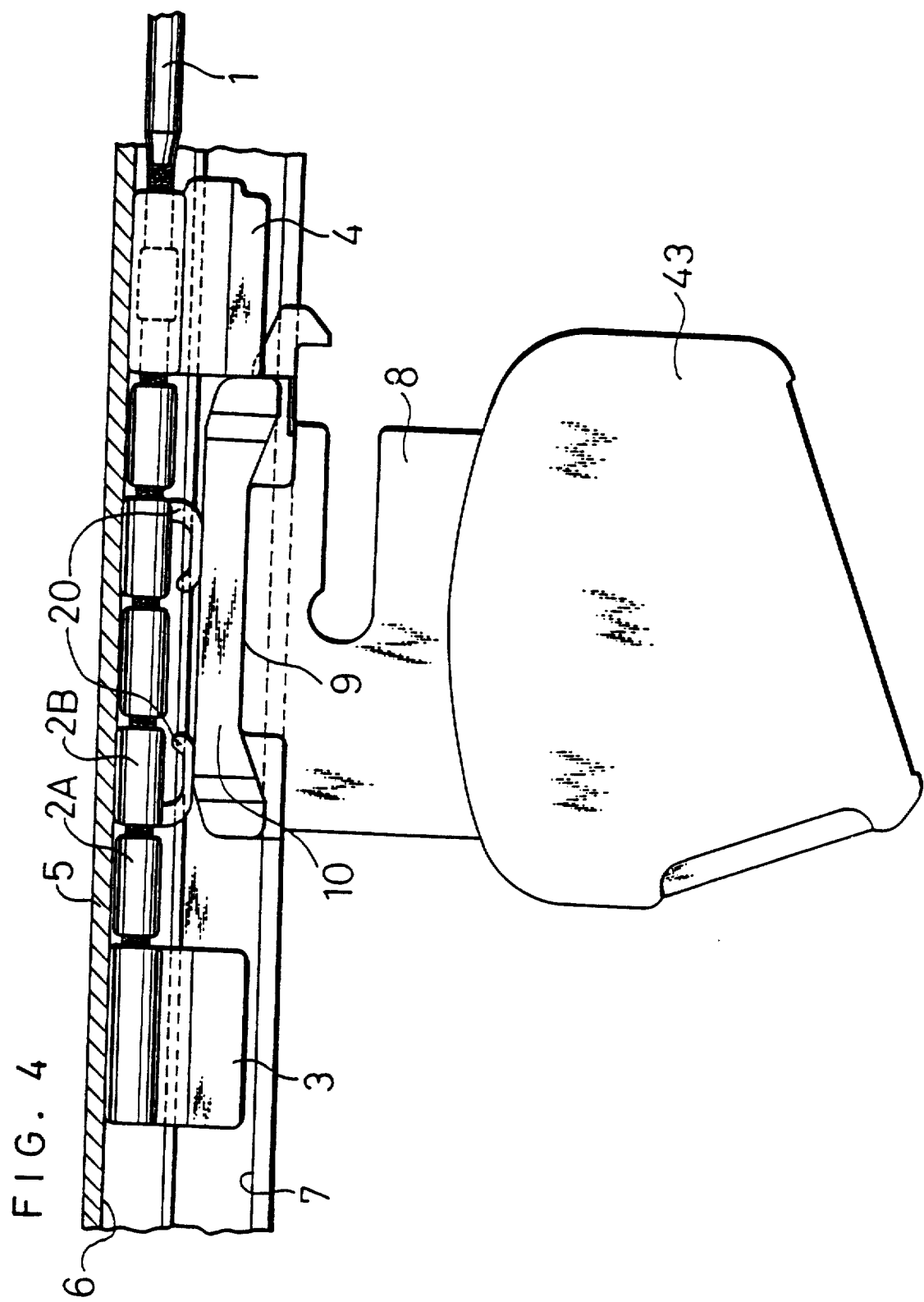
FIG. 4 is a partly cut-off fragmentary side view of a passive seat belt system according to a third embodiment of this invention.

The first embodiment of this invention may be modified in such a way that the bushings 2A are all removed and the upper edges of the drive blocks 3,4 are maintained in contact with the wire channel 6 of the rail 5 as shown in FIGS. 3 and 4 to be described subsequently.

FIGS. 3 and 4 illustrate the second and third embodiments of this invention, in which the slider 8 is movable toward the drive member.

In FIG. 3, the resin molding 10 of the slider head portion 9 is provided with fingers 19 formed concurrently with the formation of the resin molding 10. The fingers 19 project toward their corresponding bushings 2B. Owing to the resiliency of the synthetic resin, the fingers 19 allow the slider 8 to move toward the wire 1 in accordance with the shape of the rail 5.

In FIG. 4, opposite to the second embodiment of FIG. 3, the bushings 2B are provided with a finger 20 formed concurrently with the formation of the bushings 2B. The fingers 20 project toward the slider head portion 9. Their effects are similar to those of the fingers 19 in the second embodiment.

Needless to say, similar effects and advantages can also be brought about by interposing a resilient member, such as a leaf spring or coil spring, between the slider head portion 9 and bushings 2A,2B.

Figure 5:
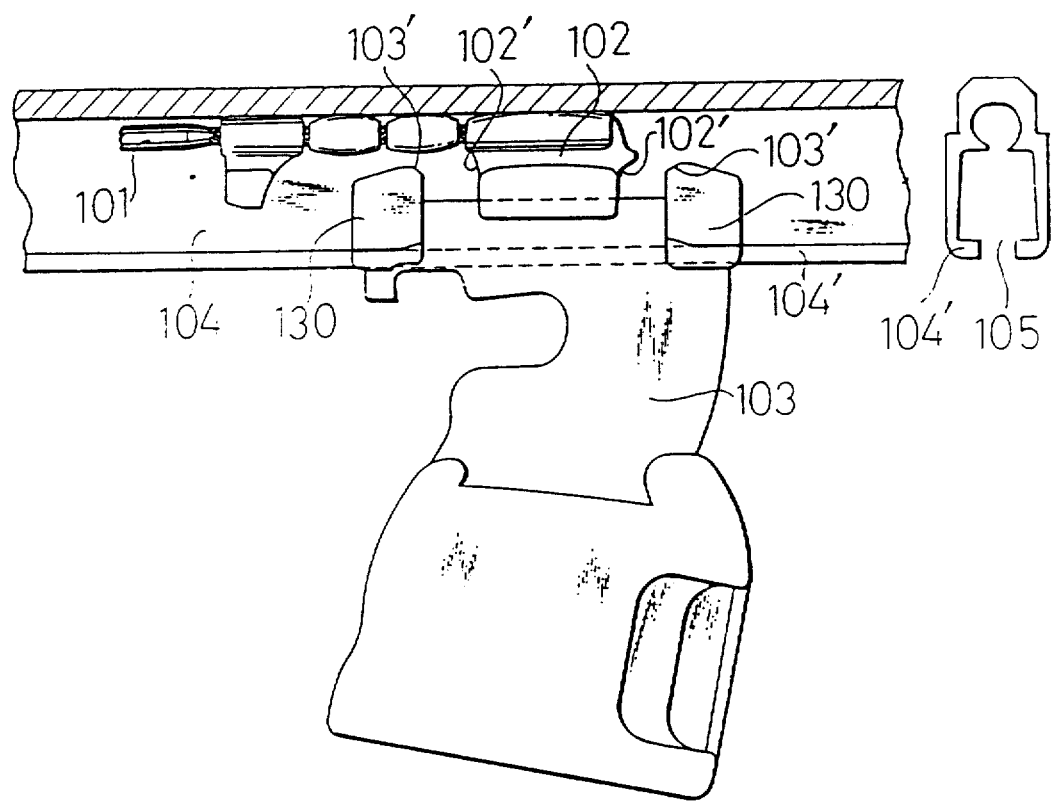
FIG. 5 is a partly cut-off fragmentary side view of a passive seat belt system according to a fourth embodiment of this invention, which is of the type that a slider is pushed at a front end portion thereof as viewed in the moving direction of the slider.

FIG. 5 illustrates the fourth embodiment of this invention, in which the slider is pushed at a front end portion thereof as viewed in the moving direction of a slider 103. A slide connector 102 is attached to a wire 101 as a drive member. The slider 103 is alternately pushed at inner ends thereof by the front and rear ends of the slide connector 102 respectively. The front and rear ends of the slide connector 102 define tilted surfaces. Irrespective of the moving direction of the slider 103, in other words, whether the slider 103 moves in an occupant restraining direction or in an occupant releasing direction, the slide connector 102 is maintained at its corresponding tilted surface in contact with the slider 103 so as to drive the slider 103.

The drive force of the slide connector 102 has a component parallel to the guide rail 104 and another component perpendicular to the guide rail 104. The ratio of these components changes depending on the angles of tilted surfaces 102',103' of the contacting portions of the slide connector 102 and slider 103. As the tilted surfaces 102',103' become more perpendicular to the guide rail 104, the parallel component becomes greater. As the tilted surfaces 102',103' become more parallel to the guide rail 104, the perpendicular component becomes more dominant. The parallel component serves as a force to drive the slider 103, while the perpendicular component works as a force to push the slider 103 toward a slot 105 of the guide rail 104.

Since the ratio of the force component pressing the slider 103 against against guide portions 104' of the guide rail 104 to that driving the slider 103 along the guide rail 104 is always maintained constant owing to the provision of the slide connector 102, no rattling arises even if a large clearance exists between the slider 103 and guide rail 104. As a consequence, the slider 103 can be driven smoothly. If the former force component is too large relative to the latter force component, the sliding resistance between the slider 103 and the guide portions 104' of the guide rail 104 is too much to permit smooth driving of the slider 103. It is hence necessary to set the angle of the tilted surfaces at a suitable value. If the angle of the tilted surfaces is small, the force component pressing the slider 103 against the guide portions 104' of the guide rail 104 is so small that the slider 103 is separated from the guide portions 104' of the guide rail 104 due to variations in the other force component and/or other causes, thereby rattling and chattering in some instances.

It is therefore necessary to determine the angle of the tilted surfaces at a suitable value in accordance with the degree of sliding resistance between the guide portions 104' of the guide rail 104 and the slider 103, the dimensions of the slider 103, etc.

Since the slide connector 102 drives at the front or rear end thereof the slider 103 from the inside of its corresponding raised portion 130 of the slider 103, the drive force is applied to the slider 103 as if the slider 103 is pulled by the drive force. Even if the slider 103 is about to be jammed on the guide rail 104, the slider 103 is always driven in a direction that it is released from jamming. The slider 103 can therefore be driven smoothly without substantial chattering.

Figure 6:
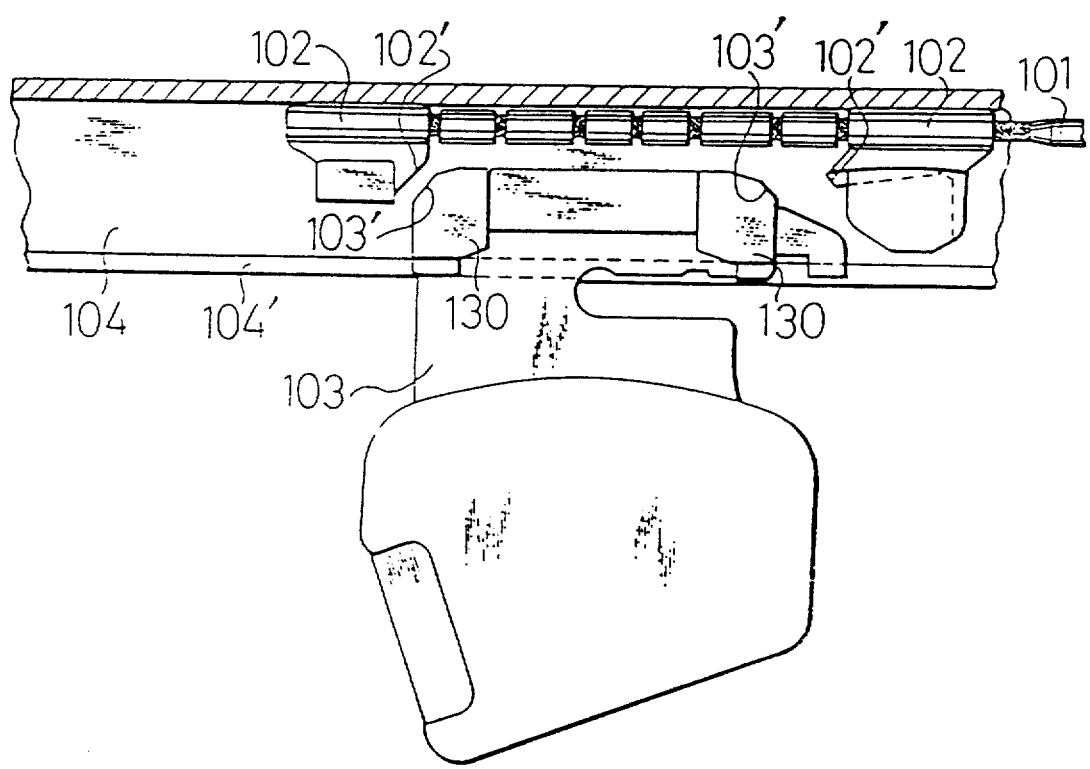
FIG. 6 is a partly cut-off fragmentary side view of a passive seat belt system according to a fifth embodiment of this invention, which is of the type that a slider is pushed at a rear end portion thereof as viewed in the moving direction of the slider.

FIG. 6 illustrates the fifth embodiment of this invention, in which two slide connectors 102 are molded on the wire 101 so as to form a drive member. Namely, the passive seat belt system of the fifth embodiment is of the type that either one of the slide connectors 102 drives the slider 103 from the outside of the corresponding one of the raised portions 130,130. The slide connector 102 and slider 103 are brought into contact at either one of the tilted surfaces 102',102' and its corresponding tilted surface 103'. The drive force is divided into parallel component and perpendicular component, both relative to the guide rail 104. The parallel component serves to drive the slider 103, while the perpendicular component acts to push the slider 103 toward the slot 105 (see FIG. 5) of the guide rail 104. Like the fourth embodiment, clearance is eliminated between the slider 103 and guide rail 104 because of the force of the perpendicular component so that generation of chattering vibrations is prevented. The angle of each tilted surface should be a value large enough to avoid chattering vibrations yet sufficiently small enough to avoid any unduly large sliding resistance.

Figure 7:
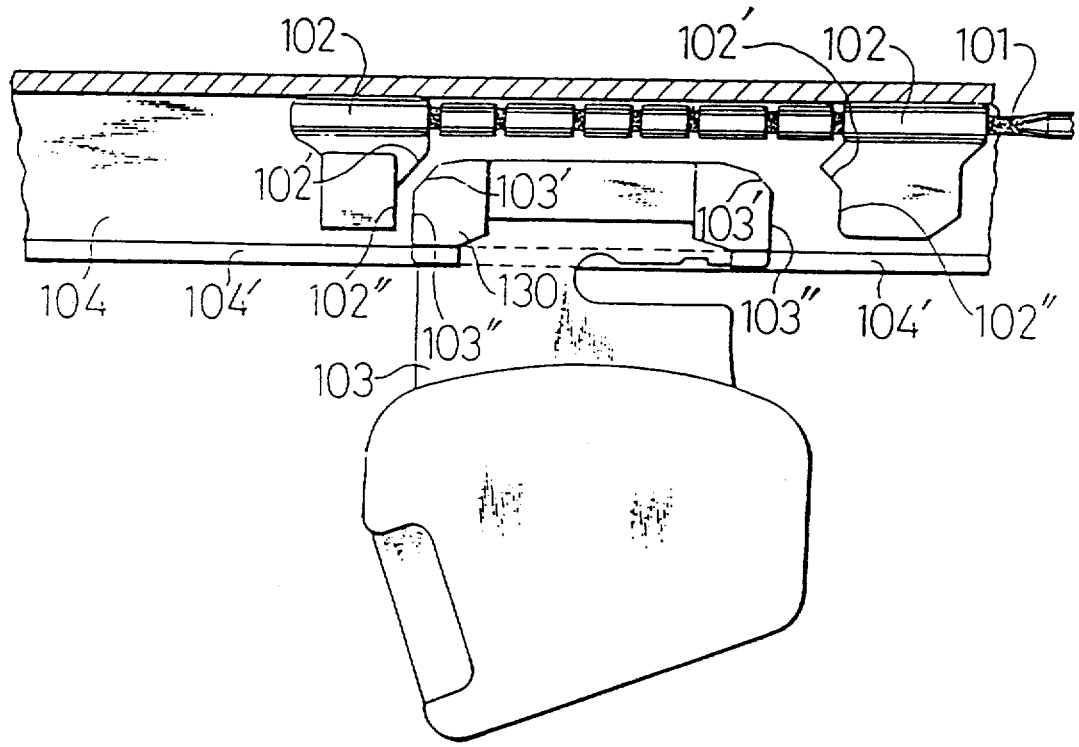
FIG. 7 is a partly cut-off fragmentary side view of a passive seat belt system according to a sixth embodiment of this invention, which is of the type that a slider and a slide connector are in mutual contact at a vertical surface and a tilted surface.

FIG. 7 depicts the third embodiment of this invention, in which the slider 103 and slide connector 102 are brought into contact at either one of the tilted surfaces 102',102' and its corresponding tilted surface 103' as well as at their associated vertical surfaces 102" and 103".

When the slider 103 is in contact with the guide rail 104 or very small clearance is given to the slider 103 relative to the guide rail 104, the slider 103 and slide connector 102 are maintained in mutual contact at either one of the vertical surfaces 102",102" and its corresponding vertical surface 103" so that the drive force acts in its entirety as a parallel component and no force is applied to press the slider 103 against the guide portions 104' of the guide rail 104. Since either little or no clearance is given to the slider 103 in this case, no chattering vibrations are produced. If the slider 103 is separated from the guide portions 104' of the guide rail 104 and rattling takes place, the slider 103 and slide connector 102 are brought into contact at either one of the tilted surfaces 102',102' and its corresponding tilted surface 103' so that a force is applied to press the slider 103 against the guide portions 104' of the guide rail 104 and only a small clearance is allowed between the slider 103 and the guide portions 104 of the guide rail 104. No chattering vibrations occur accordingly.

Figure 8:
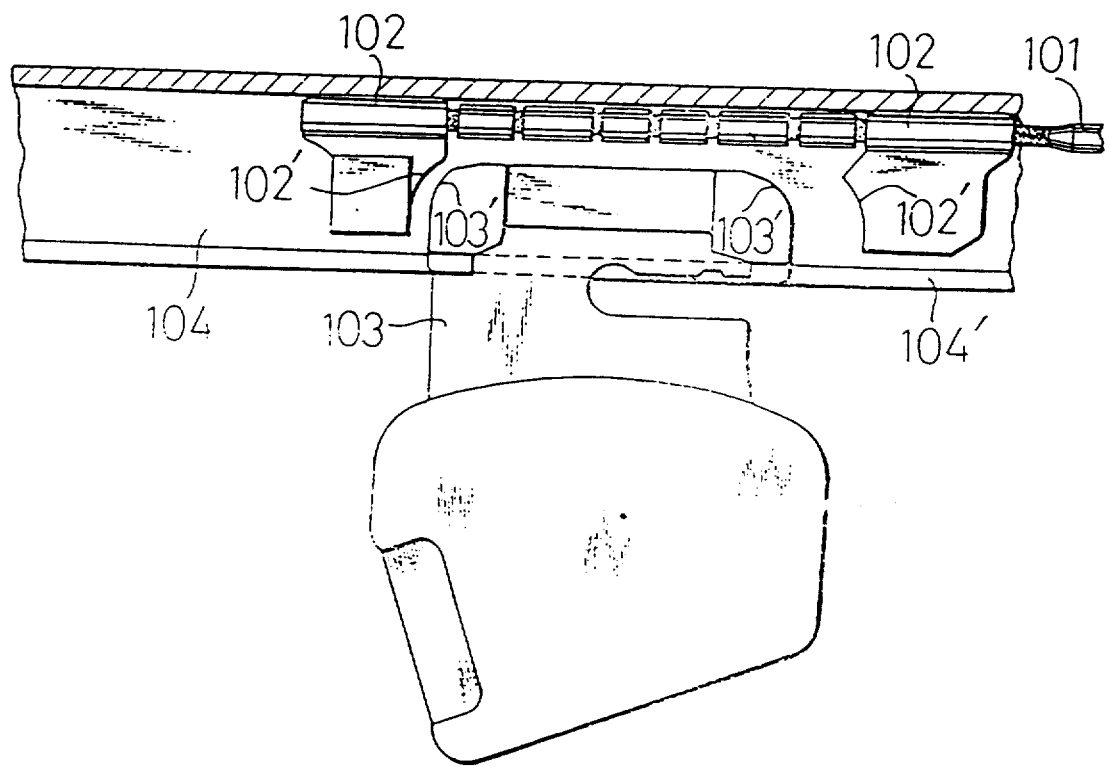
FIG. 8 is a partly cut-off fragmentary side view of a passive seat belt system according to a seventh embodiment of this invention, which is of the type that a slider and a slide connector are in mutual contact at curved surfaces.

FIG. 8 depicts the seventh embodiment of this invention, which is one example of the type that the slider 103 and slide connector 102 are maintained in contact with each other at curved surfaces.

When the slider 103 is in contact with the slot 105 (see FIG. 5) of the guide rail 102 or a small clearance exists between the slider 103 and the guide rail 102, the slider 103 and slide connector 102 are maintained in mutual contact at either one of curved surfaces 102',102' and its corresponding curved surface 103', each of said curved surfaces 102',102',103' being close to a vertical surface, so that the force pressing the slider 103 against the guide portions 104' of the guide rail 104 is small. When greater clearance is given to the slider 103 relative to the guide portions 104' of the guide rail 104, the slider 103 and slider connector 102 are brought into contact at a larger angle so that the force pressing the slider 103 against the guide portions 104' of the guide rail 104 increases. The position of the slider 103 is therefore automatically controlled to reduce the play between the slider 103 and the guide portions 104' of the guide rail 104, whereby chattering vibrations are prevented.

FIG. 9 illustrates the direction of transmission of a force when the slide connector 102 and slider 103 are in mutual contact at the tilted surfaces 102' and 103' only. The drive force applied to the wire 101 is divided into a parallel component for driving the slider 103 and a perpendicular component.

FIGS. 10A and 10B show the manner of transmission of a force from the slide connector 102 to the slider 103 between their corresponding tilted surfaces and between their corresponding vertical surfaces respectively. In FIG. 10A, the clearance between the slider 103 and the guide portions 104' of the guide rail 104 is great. In this case, the slide connector 102 and slider 103 are maintained in mutual contact at the tilted surfaces 102',103' so that the force is transmitted in the same manner as in FIG. 9. When there is no clearance between the slider 103 and the guide portions 104' of the guide rail 104, the slide connector 102 and slider 103 are maintained in mutual contact at the vertical surfaces 102",103" so that the parallel component alone is transmitted. In FIG. 10B, $\Delta S$ indicates a gap which is designed to exist between the tilted surfaced 102' and 103' even when the slide connector 102 and slider 103 are in mutual contact.

Having now fully described the invention, it will be apparent to one of ordinary skill in the art that many changes and modifications can be made thereto without departing from the spirit or scope of the invention as set forth herein.

I claim:

1. A passive seat belt system comprising:
    a guide rail;
    a slider movable along a longitudinal direction of the guide rail;
    a webbing fastened to the slider, said slider being slidingly guided on a guide portion of the guide rail located on a side of a portion of the slider at which the webbing is fastened to the slider, whereby the webbing can provide selectively both an occupant restraining state and an occupant non-restraining state;
    a drive member movable along the longitudinal direction of the guide rail for driving the slider, said drive member being located in the guide rail on a side of the slider away from the webbing-fastened portion of the slider; and
    cam means provided between the drive member and the slider for producing a component force directed at an angle toward the guide rail when the drive member moves in said longitudinal direction such that the slider is moved toward the guide portion, said cam means being provided on at least one of the drive member and the slider and defining a straight cam surface which is tilted at an acute angle with respect to the moving direction of the slider.

2. The system as claimed in claim 1, wherein the cam means is attached to the drive member, located short of the slider as viewed in the advancing direction of the drive member, and tilted in opposition to the slider.

3. The system as claimed in claim 1, wherein the cam means is formed on the slider.

4. A passive seat belt system comprising:
a guide rail;
a slider movable along a longitudinal direction of the guide rail;
a webbing fastened to the slider, said slider being slidingly guided on a guide portion of the guide rail located on a side of a portion of the slider at which the webbing is fastened to the slider, whereby the webbing can provide selectively both an occupant restraining state and an occupant non-restraining state;
a drive member movable along the longitudinal direction of the guide rail for driving the slider, said drive member being located in the guide rail on a side of the slider away from the webbing-fastened portion of the slider; and
cam means provided on the drive member and engageable with the slider for producing a component force when the drive member moves in the longitudinal direction such that the slider is moved toward the guide portion, said cam means defining a cam surface inclined at an acute angle and a straight surface extending in a direction perpendicular to the moving direction of the drive member so that when the slider has moved away from the drive member by at least a predetermined distance toward the guide portion, the straight surface engages an opposing end surface formed on the slider to transmit force only in the direction of movement of the drive member.

* * * * *